United States Patent [19]

Arnold et al.

[11] Patent Number: 4,474,247

[45] Date of Patent: Oct. 2, 1984

[54] AUTOMATIC BI-POSITIONABLE MECHANISM FOR PLOWS

[75] Inventors: Loren G. Arnold, Rock Island; Paul D. Parker; James F. Sullivan, both of East Moline, all of Ill.

[73] Assignee: Deere & Company, Moline, Ill.

[21] Appl. No.: 497,387

[22] Filed: May 23, 1983

Related U.S. Application Data

[62] Division of Ser. No. 275,572, Jun. 22, 1981, Pat. No. 4,410,047.

[51] Int. Cl.³ ............................................. A01B 63/22
[52] U.S. Cl. .................................. 172/413; 92/13.41; 92/118
[58] Field of Search .................. 172/413, 484, 328; 92/13.41, 13.4, 13, 118

[56] References Cited

U.S. PATENT DOCUMENTS

| | | | |
|---|---|---|---|
| 2,637,564 | 5/1953 | Stratman | 172/413 X |
| 2,668,062 | 2/1954 | Drummond | 172/413 |
| 2,778,290 | 1/1957 | Greeson | 172/413 X |
| 3,155,168 | 11/1964 | Telecky | 172/484 |
| 3,236,313 | 2/1966 | Arnold | 172/328 |
| 3,557,881 | 1/1971 | Sullivan | 172/413 |
| 4,113,031 | 9/1978 | Venable | 92/13.41 |

*Primary Examiner*—Richard J. Johnson
*Attorney, Agent, or Firm*—Henderson & Sturm

[57] ABSTRACT

A tractor-drawn plow is carried at its left front end on a tractor via vertically shiftable hitch means and at its right front end on a furrow wheel linkage means providing for raising and lowering of the frame among transport, open-up plowing and normal plowing positions. The hitch means and furrow wheel linkage include separate hydraulic motors of the two-way type, and these are connected hydraulically in series, with provision for re-phasing, to insure substantial leveling of the frame during raising and lowering movement of the frame. Provision is made in the connection of the hitch motor to the hitch means for enabling limited retrograde movement of the hitch motor piston to a position covering the re-phase port after the hitch motor has extended to fully raise the frame. Further provision is made in the furrow wheel linkage enabling lowering of the frame to either open-up plowing position or normal plowing position by retraction strokes of the same length of the furrow wheel motor.

4 Claims, 15 Drawing Figures

FIG. 14 under the invention finds utility.

AUTOMATIC BI-POSITIONABLE MECHANISM FOR PLOWS

This application is a division of U.S. Pat. application Ser. No. 275,572, filed June 22, 1981, now U.S. Pat. No. 4,410,047.

BACKGROUND OF THE INVENTION

It is typical of the usual tractor-drawn plow that it is connected or supported at its laterally spaced front portions by vertically shiftable hitch means on a tractor and on a vertically shiftable linkage means on a furrow wheel. U.S. Pat. No. 3,236,313 discloses an arrangement in which the furrow wheel linkage includes a two-way hydraulic motor and the linkage is mechanically connected to the hitch means so that operation of the motor activates the furrow wheel linkage and hitch means substantially in unison so that substantial leveling of the plow frame is achieved during movement between raised and lowered positions. It is also typical of such plow that, during lowering of the frame from fully raised or transport position to a position for opening up the field, the frame will descend to a greater distance in relation to the front furrow wheel than when it is lowered from transport to the normal plowing position, because, in the opening-up plowing position, the furrow wheel is traveling on unplowed land and, in normal plowing position, the furrow wheel runs in a previously formed furrow. In the recent past it has been necessary to control a hydraulic cylinder in two phases, one stroke for lowering to open-up plowing position and a different stroke for lowering to normal plowing position.

BRIEF DESCRIPTION OF THE INVENTION

It is a feature of the invention to provide mechanism for eliminating the deficiencies in prior art systems, especially with respect to the hitch leveling means and to the furrow wheel linkage. As to the hitch means, a system is provided for obtaining a substantial mechanical advantage so that raising and lowering is facilitated. As to the furrow wheel linkage, there is provided an automatically operative bi-positional mechanism enabling lowering of the plow to either of its open-up plowing or normal plowing positions by a hydraulic motor utilizing strokes of the same length in both phases of position change. The hitch means is provided with a two-way hydraulic motor or cylinder and piston unit and the furrow wheel linkage includes a separate two-way hydraulic motor. These are hydraulically interconnected in series, with provision for re-phasing of the respective pistons.

In the re-phasing aspect, the hitch piston, when fully extended to raise the hitch means, uncovers a re-phasing port, which, if left uncovered while an extension force is present, will prevent retraction of the motor for lowering operation. It is a feature of the invention to provide means enabling the hitch piston to incur a limited amount of retrograde movement sufficient to recover the re-phasing port. As will be seen from the ensuing description, this means includes a slotted arm having a pin riding in the slot and connected to the hitch piston rod, together with a stop which limits rocking of the arm in the hitch-raising direction so that the pin can ride in the slot to a sufficient extent to achieve the aforesaid retrograde movement of the hitch piston.

The bi-positionable mechanism for the furrow wheel linkage takes the form of an arm rockable between two positions respectively at opposite sides of an over-center position, together with front and rear limiting stop means controlling rocking of the arm so that when it swings to one position it compensates for the difference in vertical travel of the plow frame as between open-up plowing and normal plowing positions, thus enabling the furrow wheel motor to have the same stroke in either case.

These and other features and advantages of the invention will be made apparent as a preferred embodiment of the invention is brought out in detail in the ensuing description and accompanying sheets of drawings.

DETAILED DESCRIPTION OF THE INVENTION

Figure 1:
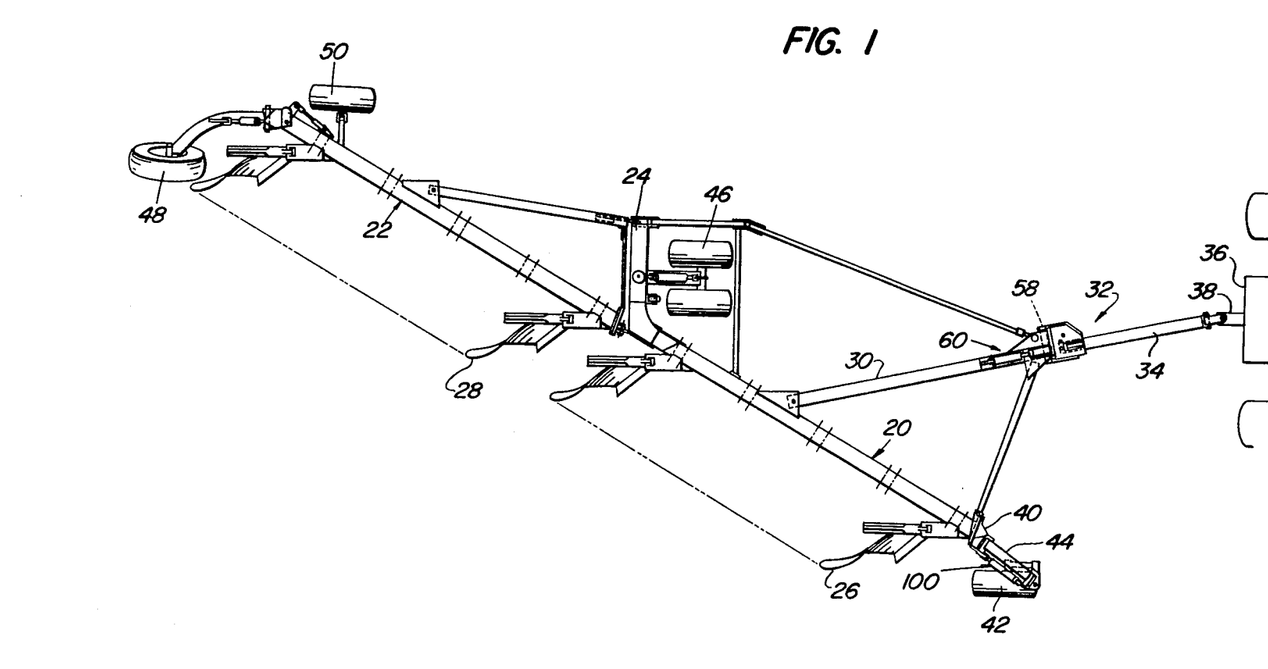
FIG. 1 is a plan view of a representative plow in which the invention finds utility.

Reference will be had first to FIG. 1 as setting the basis for the application of the invention. For purposes of illustration, a tandem plow is shown as having front and rear main frames or beams 20 and 22 respectively. These are hinged together on a substantially transverse axis in the area of the numeral 24. The front frame includes a series of typical plow bottoms 26, some of which are omitted for clarity, and the rear frame likewise has a series of bottoms 28. The front frame or beam includes a forwardly extending hitch bar 30 which is rigid with the frame, at least as against relative vertical movement, and which is supported on hitch means 32 that includes a rigid hitch member 34 connected to and supported by an angricultural tractor 36 having a drawbar 38. Since the frame 20 extends obliquely to the line of travel, its foward right end 40 is rightwardly of the left front end as represented by the hitch bar, and this right end is carried on a right front furrow wheel 42 by furrow wheel linkage 44 to be described later. The rear end of the frame 20, as well as the front end of the rear frame 22, is supported by an intermediate wheeled support in the form of a rubber-tired bogie 46, and the rear end of the rear frame is carried, as is typical, on a rear furrow wheel 48 and a gauge wheel 50.

Figure 2:
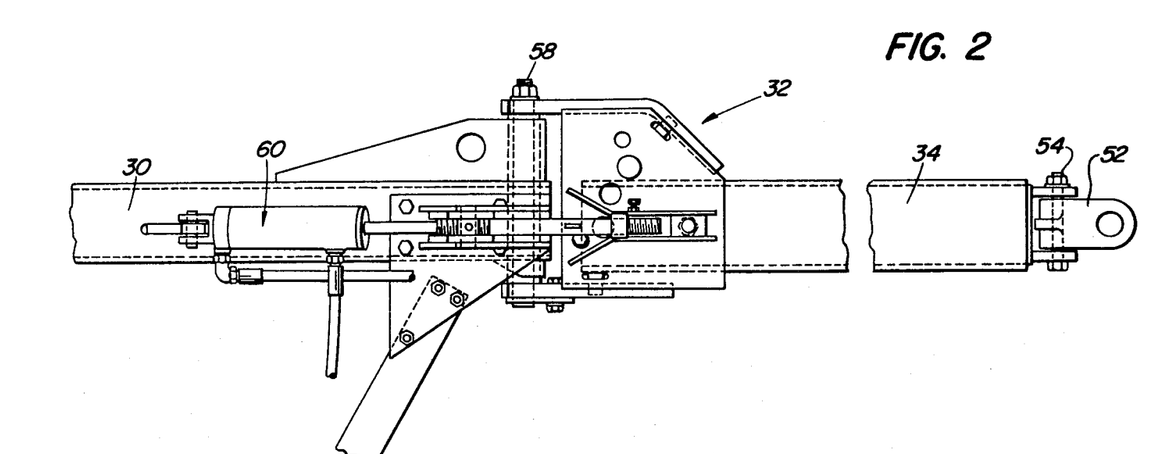
FIG. 2 is a fragmentary plan view, drawn to a scale enlarged over that used in FIG. 1, showing the hitch means and hitch motor.
Figure 3:
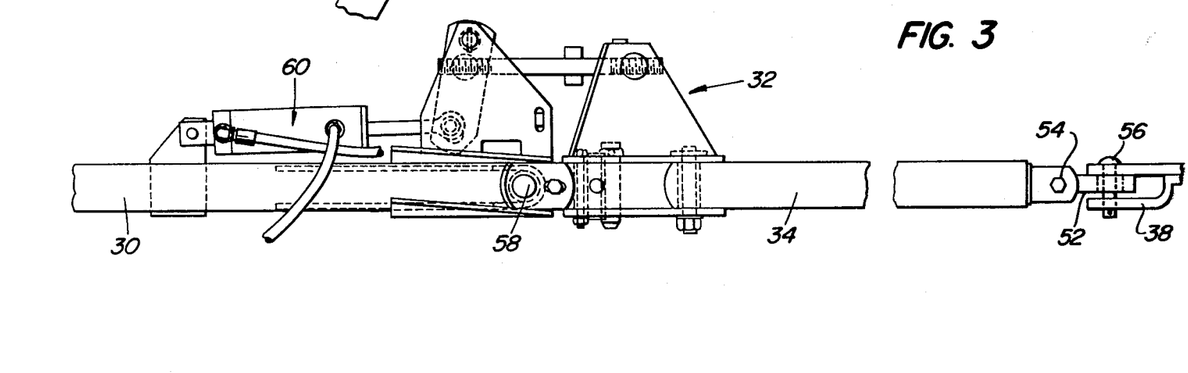
FIG. 3 is a side elevation of the structure shown in FIG. 2.

As best seen in FIGS. 2 and 3, the front end of the rigid member 34 of the hitch means 32 derives support from the tractor drawbar via a clevis 52 which includes a pivot 54 on a transverse axis and a vertical pivot 56. The hitch bar 30 and the rigid member 34 are hinged together on a transverse axis or pivot 58, and the front left end of the frame 20 is raised and lowered about the pivot 58 as the hitch bar and rigid member "buckle" upwardly or downwardly, thus giving the hitch means the characteristic of being vertically shiftable. Raising and lowering about the pivot 58 is achieved by force-exerting means, here in the form of a two-way hydraulic motor or cylinder and piston unit 60. Any suitable type motor may be used for this purpose, that selected for illustration being of the type known in the art as a remote cylinder. In the present case, reference will be had to the functions of this motor as raising the hitch means upon extension and lowering of the hitch means by retraction. It will be obvious of course that the parts could be reversed or connected with suitable linkage to accomplish the reversal of these functions. Hence, the description should be taken as illustrative or representative and not limiting.

Figure 5:
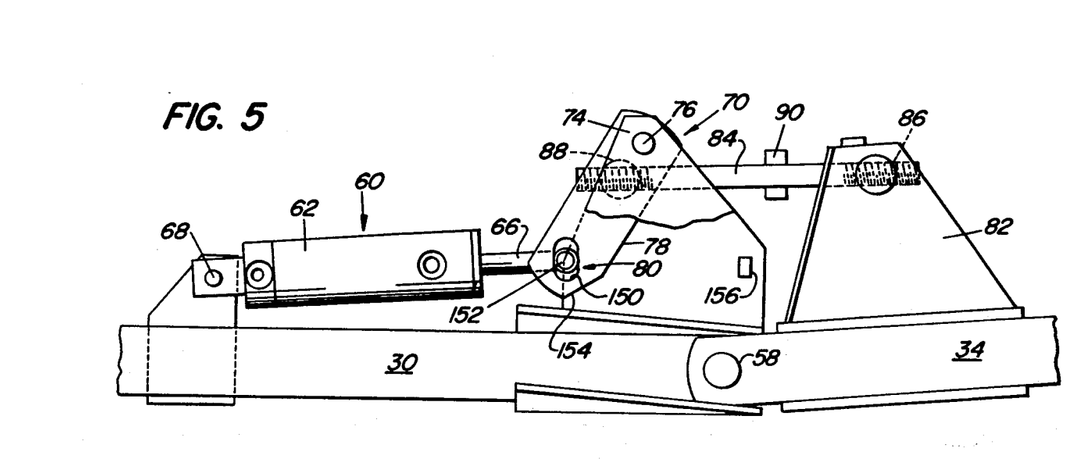
FIG. 5 is a side view, similar to FIG. 3 but enlarged, showing the hitch means as disposed in lowered position of the plow frame.
Figure 6:
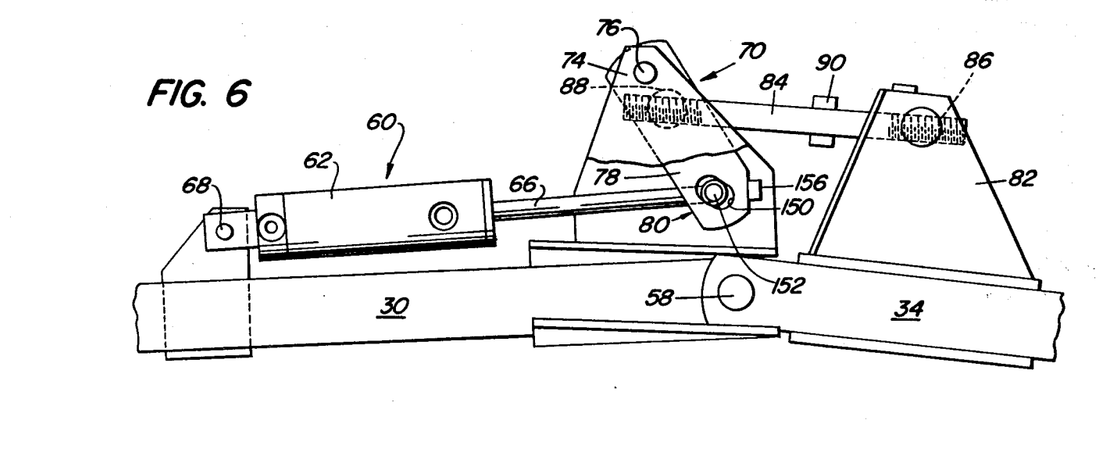
FIG. 6 is a similar view but showing the hitch as positioned when the plow frame is raised.

The motor 60 includes a cylinder 62, a piston 64 (FIG. 7) and a piston rod 66. The cylinder has an anchor 68 to the hitch bar 30 to the rear of the cross pivot 58, and the piston rod extends forwardly for connection by force-transmitting means 70 to the hitch means rigid member 34. For this purpose, the hitch bar carries rigidly thereon and just to the rear of the pivot 58 an upstanding support 74, which may be of any suitable design, such as utilizing a pair of vertical plates between which an arm 78 is rockable fore and aft by means of a pivot 76. The arm depends from the pivot 76 and has its lower end portion connected to the free end of the piston rod 66 by means 80, to be described in detail subsequently. A second upstanding support 82 is rigidly carried by the hitch means rigid member 34 ahead of the pivot 58, and this support is operatively connected to the arm 78 by a force-transmitting connection such as a link 84. The front and rear ends of this link are threadably connected at 86 and 88 respectively to the front support and arm 78, the rear connection 88 being made to the arm below the arm pivot 76 so as to provide the desired mechanical advantage as the motor 60 is extended and retracted. The threaded connections at 86 and 88 provide for variations in the distance between the arm and the front support, which is accomplished by means of a nut or like portion 90 rigid on the intermediate portion of the link. Extension of the piston rod 66 swings the arm 78 forwardly to exert a forward force on the front support 82, which causes the hitch bar and hitch means to pivot upwardly at the pivot 58, the hitch means rigid member 34 of course pivoting also about its pivot 54 to the tractor. Conversely, retraction of the motor 60 causes lowering of the bar and member 30 and 34. FIGS. 3 and 5 show the parts in plowing or lowered position. FIG. 6 shows the parts in raised position. For the present, description of the hydraulic operation of the motor 60 will be deferred.

As previously described herein, the right front end of the plow frame 20 is supported on the front furrow wheel 42 by means of the linkage 44. FIGS. 4 and 9 through 14 best show the details of the furrow wheel-to-frame support and raising and lowering of the frame relative to the furrow wheel.

Figure 4:
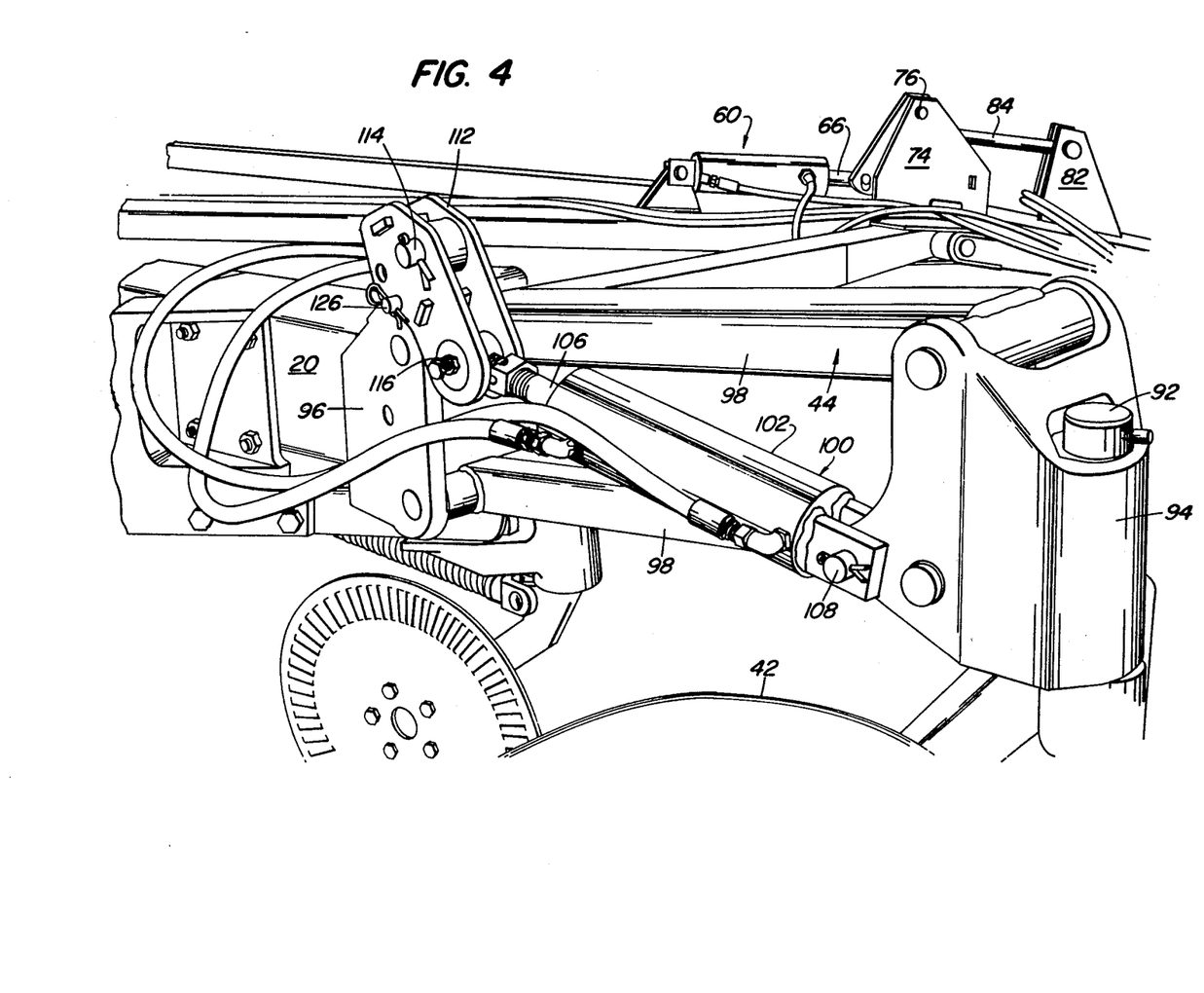
FIG. 4 is an enlarged, fragmentary perspective showing the furrow wheel linkage and associated motor.

The furrow wheel includes an axle (not shown) which is integral or rigid with an upstanding spindle 92 which is journaled on a vertical axis in a casting or carrier 94. The front end of the frame 20 has rigid thereon a bracket or support 96, and the furrow wheel linkage 44 is here shown as comprising a pair of parallel links 98 connected at opposite ends respectively to the furrow wheel carrier and the main frame bracket 96. A second two-way hydraulic motor or cylinder and piston unit 100 is connected between the furrow wheel carrier and the main frame bracket 96 to achieve, in combination with the parallel links, raising and lowering of the frame. This, as will appear later, is coordinated with raising and lowering of the frame by the hitch motor 60.

The furrow wheel motor includes a cylinder 102, piston 104 (FIG. 8) and piston rod 106. The closed end of the cylinder has a pivotal connection 108 with the furrow wheel carrier 94, and the piston rod extends upwardly and rearwardly to connecting means 110 with the main frame bracket 96. This means, as previously referred to, operates to enable the same length extension stroke of the furrow wheel motor whether the plow is being lowered to normal plowing position or to open-up plowing position. In the present instance, the motor 100 extends to raise the frame and retracts to effect lowering thereof. What has been, said however, concerning the reversal or parts, etc., as to the hitch motor 60, applies equally well here.

The means by which the above results are obtained comprises a bi-positionable mechanism incorporating an over-center device, which here includes an arm 112 rockable on the main frame bracket 96 about a transverse pivot 114. For the purposes of convenience and clarity the rocking of the arm will be considered fore and aft, but here, as well as in the appended claims, such terms should be understood as relative and not limiting.

Figure 9:
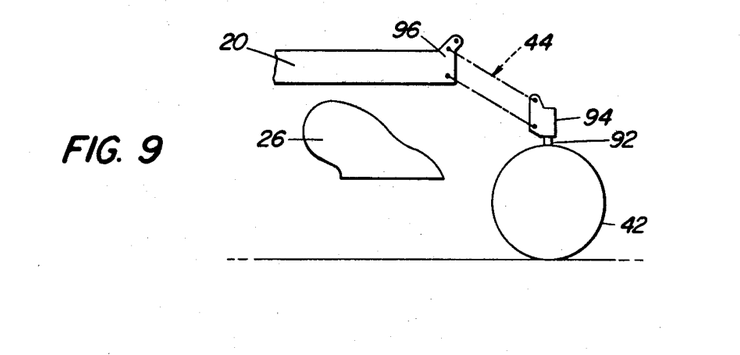
FIG. 9 is a schematic view on a reduced scale showing the relationship between the plow frame and furrow wheel in fully raised or transport position.
Figure 10:
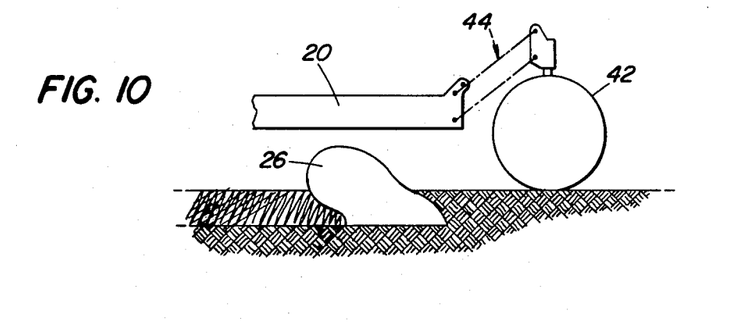
FIG. 10 is a like view but showing the parts in open-up plowing position.
Figure 11:
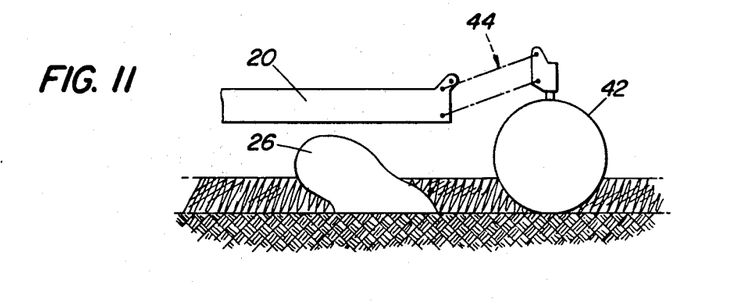
FIG. 11 is likewise a similar view but showing the parts in the normal plowing position.
Figure 12:
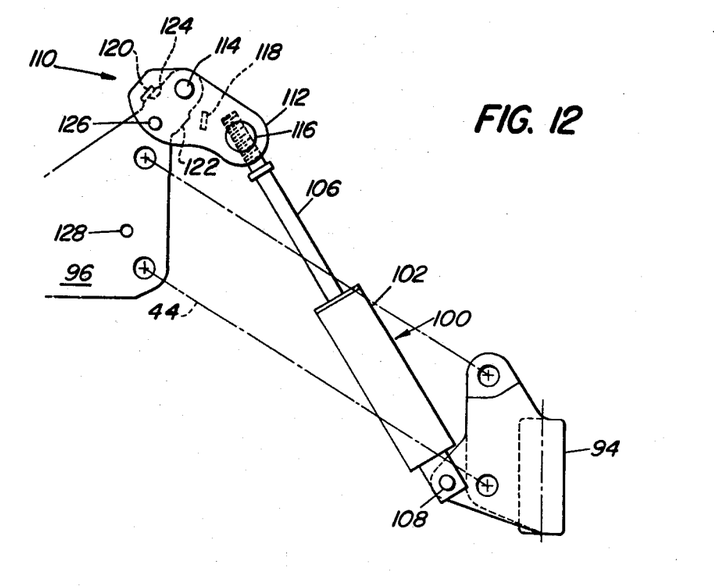
FIG. 12 is a schematic view, on a scale enlarged over that used in FIG. 9, showing the furrow wheel motor and over-center device as disposed in the transport position of the plow.

The arm extends essentially downwardly and has its free end connected to the end of the piston rod 106 by a transverse pivot pin 116 so that extension and retraction of the furrow wheel motor rocks the arm. The rocking of the arm is controlled or limited to angular movement between two positions respectively at opposite sides of a straight line drawn between the cylinder anchor pin 108 and the arm pivot 114. Controlled movement of the arm in these two phases is accomplished by the provision of front and rear stop means 118 and 120 respectively. These are provided on the arm and are respectively engageable with front and rear portions or lugs 122 and 124 on the main frame bracket 96 (FIG. 12). FIGS. 9 and 12 show the components as disposed in the transport or fully raised position of the plow. The furrow wheel motor is extended and the arm has been rocked forwardly to a position, in which the rear stop means is engaged, which prevents further counterclockwise movement of the arm and a pin 126 may be inserted through alined openings (not numbered) in the arm and main frame bracket to retain this position. When not in use, the pin may be stored in a lower hole 128 in the bracket.

Figure 13:
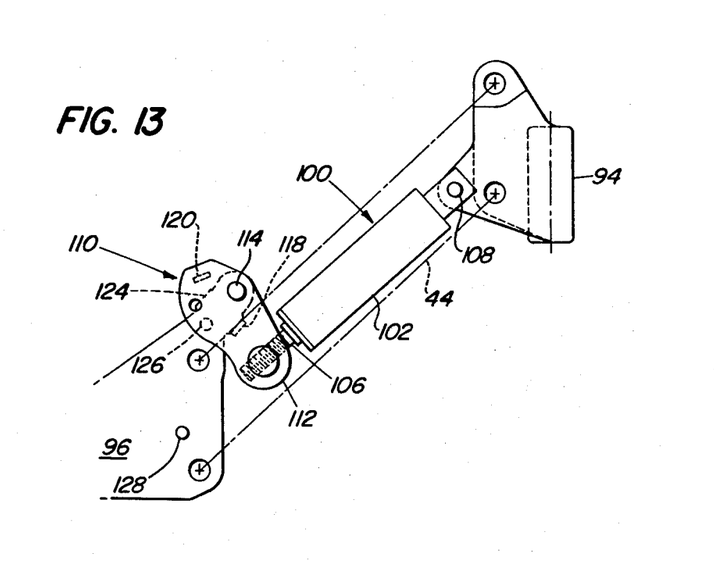
FIG. 13 is similar to FIG. 12 but shows the parts in open-up plowing position of the plow.

When the plow is to be lowered to normal plowing position (FIGS. 11 and 14), and assuming that the furrow wheel 42 will track in a furrow, the pin 126 is left in place and the motor 100 retracted. If, however, a furrow is not present, as would be the case in opening up the land, the pin is removed and the motor is retracted. Because the plow will have to descend a greater distance in relation to the furrow wheel than when lowered to a depth where a furrow is not present, the arm will snap over-center until the stops 118–122 engage (FIG. 13). This is because the furrow wheel, riding the land, is higher than when tracking in a furrow. Conversely, when it is desired to place the arm 112 back in position for normal plowing, the plow is lowered to the ground until the furrow wheel motor will involve over-center rocking of the arm until the rear stops 12–124 engage, after which the locking pin 126 is placed in the upper holes in the arm and main frame bracket or casting.

The operation of the over-center means may be better understood by considering lowering of the plow from FIG. 12 to FIG. 13. First the pin 126 is removed and stored in the hole 128. As the furrow wheel cylinder retracts, pivoting of the furrow wheel is essentially about the pin 116 until the line through 108-116-114 is reached, which is dead center. As relative movement between the plow frame and furrow wheel continues, the arm 112 snaps over-center in a clockwise position. To return to the raised position from the open-up plowing position, the arm remains in the aforesaid position. In any event, the raised position of the plow is at a constant height regardless of whether it is raised from open-up plowing position or from normal plowing position. The over-center means provides, however, for two furrow wheel plowing positions.

Figure 14:
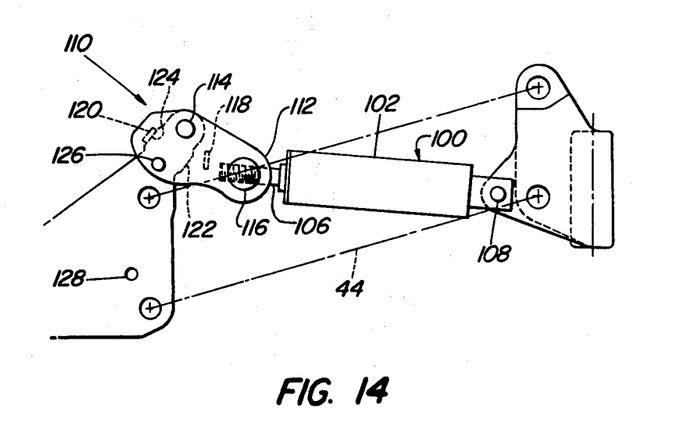
FIG. 14 follows the pattern of FIGS. 12 and 13 but shows the parts as they are in the normal plowing position of the plow.

To change from open-up raised position to normal plowing position, the plow is drawn into position and the furrow wheel enters the furrow, the plow bottoms are still on land (unplowed) and the furrow wheel literally hangs in the air. At this time, the tractor is stopped and the furrow wheel motor is retracted, lowering the plow bottoms to the ground; further retracting of the motor starts to raise the wheel from the furrow bottom, thus rotating the arm 112 counter-clockwise until the stops 120–124 engage (FIG. 14). The pin 126 is replaced in the upper hole to retain this position for normal plowing position. When the tractor is driven forwardly, the bottoms enter the ground and the furrow wheel now runs in the furrow.

Reference has been previously made to that feature of the invention that involves hydraulically connecting the hitch and furrow wheel motors in series. Furthermore, the series connection includes provision for re-phasing of the pistons. In this respect, the description will proceed with the hitch and furrow wheel motors. Although FIG. 1 shows hydraulic control means for the bogie and rear furrow and land wheels, this aspect is not significant in the present case and will not be further adverted to. Also, for the purposes of simplicity and clarity, the lines or conduits pertaining to the hitch and furrow wheel motors have been omitted in FIG. 1. Further reference will be had primarily to FIGS. 7, 7A and 8 for the basic hydraulic circuit.

Figure 7:
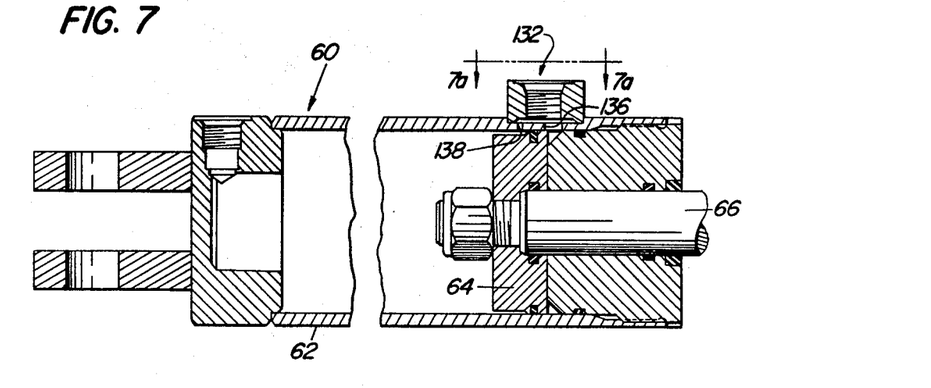
FIG. 7 is an enlarged section, with intermediate portions omitted, of the hitch motor and showing the hitch piston at the end of its extension stroke.
Figures 7A, 8:
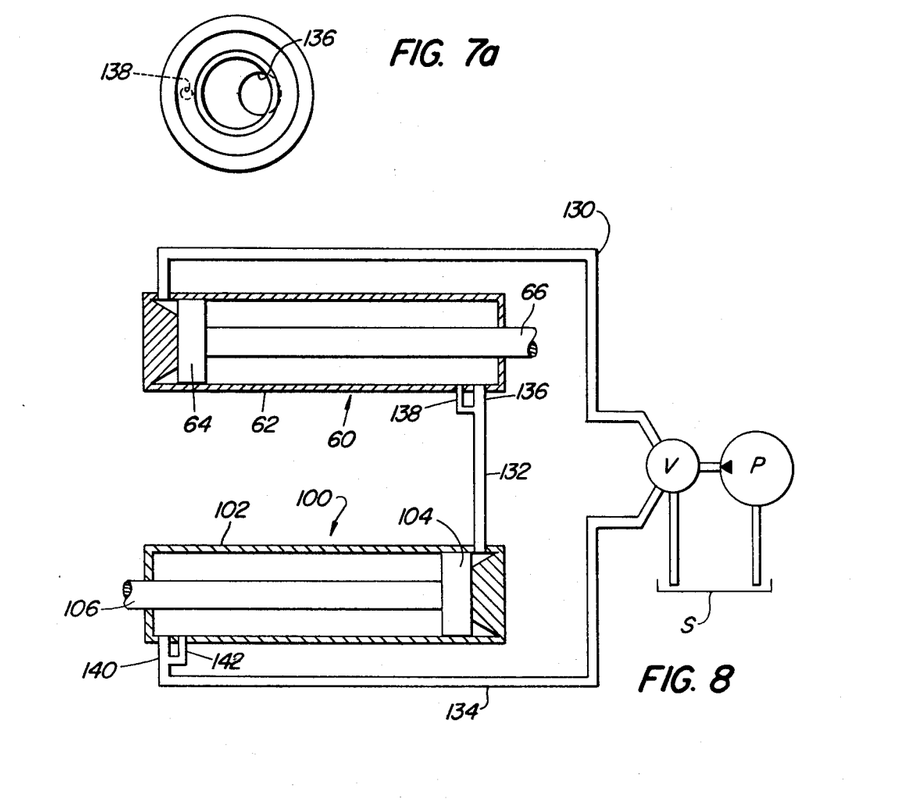
FIG. 7A is a plan as seen on the line 7A—7A of FIG. 7 and showing the relationship of the main and re-phasing ports.
FIG. 8 is a schematic illustration of a representative form of hydraulic circuit employed to connect the hitch and furrow wheel motors in re-phased series.

As indicated in FIG. 8, the tractor, as is typical, includes a hydraulic system comprising a pump P, a control valve V and a sump S. In one active position of the valve, a conduit 130 leads to the closed end of the hitch motor 60. A series conduit 132 leads from the rod end of the motor 60 to the closed end of the furrow wheel motor 100 and a return conduit runs from the rod end of the furrow wheel motor back to the valve and hence to sump. In the other active position of the valve, the conduits serve the reverse purpose. That is, the valve may be selectively positioned to pressure either motor.

In order that the series-connected motors may function accurately and efficiently, the hydraulic system includes means for re-phasing of the pistons. FIG. 7 shows a representative re-phasing means for the rod end of the hitch motor as comprising a main port 136 and a re-phasing port 138. See also FIG. 7A. Assuming that the closed end of the hitch motor is pressurized, the main port is downstream of the re-phasing port. As the piston reaches the end of its extension stroke, it uncovers the re-phasing port 138, enabling further pressurizing of the closed end of the furrow wheel motor 100 in the event that the piston therein is out of phase. The retraction stoke of the furrow wheel motor causes retraction of the hitch motor. The furrow wheel motor has main and re-phasing ports at 140 and 142 respectively.

As noted above and as shown in FIG. 7, the piston has reached the end of its extension stroke. When fluid pressure is applied to the rod end of the hitch motor to cause retraction thereof, a pressure differential is created by the re-phasing port 138 across the piston 64. Therefore, if this pressure differential creates an inward force on the piston 64 less than the external extension force on the piston rod 66, the fluid will escape through the re-phasing port and the piston 64 will not retract. This problem is solved by the provision of means to remove the extension force on the piston rod 66. This means is best shown in FIGS. 5 and 6.

Reference was had earlier herein to the means 80 that connects the piston rod 66 and the force-transmitting arm 78 of the hitch raising and lowering means 70. Part of this connection is a slot 150 in a lower portion of the arm. Another portion is a cross pin 152 that passes through the free end of the piston rod and that rides in the slot. As shown in FIG. 5, which is the lowered position of the plow, the slot, when the arm is in its rear position, is vertical or substantially so; i.e., it is normal to the general line of travel of the piston rod 66. This eliminates lost motion when the piston rod extends. A lower front portion of the arm has an angled portion 154 which, after rocking forwardly of the arm to the position of FIG. 6, engages stop means 156 on the support 76. It is at the end of this range of angular movement of the arm 78 that the hitch motor reaches the end of its extension stroke, which would mean that the hitch piston 64 uncovers the re-phasing port 138 (FIG. 7), giving rise to the problem mentioned earlier; i.e., the piston could not retract as long as there is an extension force on the piston rod 66. But, when the arm engages the stop 156, the pin 152 rides freely in about the midportion of the slot, which in the position of FIG. 6 inclines upwardly and rearwardly, thus removing any extension force on the pin 152 and rod 66. When the valve V is operated to cause lowering of the plow, the differential pressure, as explained earlier, causes the piston to retract 64, the pin 152 thus retracting freely in the slot to allow the piston 64 to cover the re-phasing port 138 so that the main port 136 is fully open to the front face of the piston 64. At this point, it is important to note that, when the plow is in fully raised position, the weight thereof is borne primarily on the front furrow wheel, the bogie and the rear wheels, the weight being generally concentrated along the line of the front and rear beams, thus removing substantially all of the plow weight from the hitch, meaning that the hitch can buckle upwardly. The reverse is the case to some extent when plowing; i.e., the weight is more on the hitch.

It is believed that operation of the means comprising the invention will have been made clear from the foregoing description. It will be seen that operation of the hitch and furrow wheel motors substantially in unison results in leveling of the front ends of the plow during raising and lowering. The incorporation of the furrow wheel control means, especially with reference to the over-center device including the arm 112, supplies the necessary compensation for differences in functions as between lowering to plowing position when a furrow is present and lowering to plowing position when the furrow wheel must travel on land, as when opening-up the field, because in either case the retraction stroke of the furrow wheel motor is the same and operation of the valve V is facilitated.

It will be understood that what has been disclosed herein is based on a preferred embodiment of the invention, and, further, that language has been employed in the description and claims such as will facilitate a ready understanding of the invention; for example, the use of such terms as "right," "left," "extension," "retraction," etc., which are all terms of reference and not intended as limitations. Moreover, features and advantages not readily apparent from the disclosure will make themselves known to those versed in the art, as will many modifications and variations in the preferred embodiment disclosed, all of which may be resorted to without departure from the spirit and scope of the invention.

We claim:

1. In a tractor-drawn plow having a main frame, a furrow wheel including a carrier, and vertically shiftable linkage supporting the frame on the furrow wheel carrier for vertical movement of the furrow wheel relative to the frame from a raised transport position to a lowered normal plowing position or, selectively, to a lowered open-up plowing position, the improvement comprising a two-way hydraulic motor having a cylinder and piston rod, means connecting the cylinder to the furrow wheel carrier, and bi-positionable means connecting the piston rod to the frame and arranged to occupy one position for open-up plowing conditions and another position for normal plowing positions to accommodate the differences in vertical distance between said two conditions, said bi-positionable means being operative automatically in response to retraction of the motor and thereby providing for retraction strokes of the same length regardless of which position of the furrow wheel is selected.

2. The improvement according to claim 1, in which the bi-positionable means includes an over-center device automatically shiftable in response to retraction of the motor to one side of an over-center position when the furrow wheel is disposed in normal plowing position and to the other side of the over-center position when the furrow wheel is disposed in open-up plowing position.

3. The improvement according to claim 2, the further improvement comprising means for releasably locking the device in the over-center position corresponding to normal plowing position of the furrow wheel.

4. The improvement according to claim 1, in which the bi-positionable means includes an arm pivoted to the frame on an axis crosswise of the line of travel of the piston rod, and a pair of angularly spaced stops are fixed on the frame to limit swinging of the arm to the angular range provided by the stops.

* * * * *

UNITED STATES PATENT AND TRADEMARK OFFICE
CERTIFICATE OF CORRECTION

PATENT NO. : 4,474,247

DATED : October 2, 1984

INVENTOR(S) : Loren G. Arnold, Paul D. Parker and James F. Sullivan

It is certified that error appears in the above-identified patent and that said Letters Patent are hereby corrected as shown below:

Claim 1, Col. 8, Line 13, change "positions" to --conditions--.

Col. 4, Line 38, change "What has been, said however,..." to --What has been said, however,...--.

Signed and Sealed this

Sixteenth Day of April 1985

[SEAL]

Attest:

DONALD J. QUIGG

Attesting Officer

Acting Commissioner of Patents and Trademarks